US012671070B2

(12) United States Patent
Covey et al.

(10) Patent No.: US 12,671,070 B2
(45) Date of Patent: Jun. 30, 2026

(54) SAMPLING FROM A MAGNETIC INDUCED HETEROGENOUS SYSTEM

(71) Applicant: DH Technologies Development Pte. Ltd., Singapore (SG)

(72) Inventors: Thomas R. Covey, Concord (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 346 days.

(21) Appl. No.: 18/286,160

(22) PCT Filed: Apr. 7, 2022

(86) PCT No.: PCT/IB2022/053300

§ 371 (c)(1),
(2) Date: Oct. 9, 2023

(87) PCT Pub. No.: WO2022/215043

PCT Pub. Date: Oct. 13, 2022

(65) Prior Publication Data

US 2024/0203717 A1 Jun. 20, 2024

Related U.S. Application Data

(60) Provisional application No. 63/173,300, filed on Apr. 9, 2021.

(51) Int. Cl.
*H01J 49/04* (2006.01)

(52) U.S. Cl.
CPC ...... *H01J 49/0445* (2013.01); *H01J 49/0409* (2013.01); *H01J 49/0454* (2013.01)

(58) Field of Classification Search
CPC .............. H01J 49/0445; H01J 49/0454; H01H 49/0409
See application file for complete search history.

(56) References Cited

U.S. PATENT DOCUMENTS

2022/0152628 A1* 5/2022 Abrahamsson ....... B03C 1/0335

FOREIGN PATENT DOCUMENTS

| | | |
|---|---|---|
| WO | 2020157736 A1 | 8/2020 |
| WO | 2020190845 A1 | 9/2020 |

OTHER PUBLICATIONS

Ge Shencheng et al: “Magnetic Levitation in Chemistry, Materials Science, and Biochemistry”, Angewandte Chemie International Edition, vol. 59, No. 41, Jun. 4, 2019 (Jun. 4, 2019), pp. 17810-17855, XP055934164, ISSN: 1433-7851.
International Search Report and Written Opinion, PCT/IB2022/053300, Dated Jul. 4, 2022, pp. 16.

* cited by examiner

*Primary Examiner* — Nicole M Ippolito
(74) *Attorney, Agent, or Firm* — Potomac Law Group, PLLC; Reza Mollaaghababa; Brian Hairston

(57) ABSTRACT

In one aspect, a method of extracting a target analyte from a sample for introduction into a mass spectrometer is disclosed, which includes mixing the sample with a paramagnetic medium to form a mixture, subjecting the mixture to a magnetic field gradient to form a non-homogenous distribution of at least one of the analyte and at least one interfering component of the sample, if any, thereby enhancing a concentration of the target analyte within a spatial location of said mixture, extracting at least a portion of the target analyte from that spatial location, and introducing at least a portion of the extracted target analyte into said mass spectrometer.

20 Claims, 8 Drawing Sheets

SAMPLING FROM A MAGNETIC INDUCED HETEROGENOUS SYSTEM

RELATED APPLICATIONS

This application is a 35 U.S.C. § 371 national stage filing of International Application No. PCT/IB2022/053300, filed on Apr. 7, 2022, which claims priority to U.S. Provisional Application No. 63/173,300 filed on Apr. 9, 2021, the contents of both of which are incorporated herein in their entirety.

BACKGROUND

The present disclosure relates generally to methods and systems for processing a sample for introduction into a mass spectrometry system, and more particularly, to such methods and systems that allow separating a target analyte from a matrix such that the target analyte can be introduced into a mass spectrometer.

Mass spectrometry is an analytical technique for determining the elemental composition of test substances with both quantitative and qualitative applications. Mass spectrometry can be useful in identifying unknown compounds, determining the structure of a particular compound by observing its fragmentation, and quantifying the amount of a particular compound in a sample. By way of example, a sample can be ionized and the generated ions can be analyzed by downstream mass analyzers to obtain structural and compositional information about the substituents of the sample under study.

In some mass spectrometry instruments, an open port interface (OPI) is employed for introducing a sample into the instrument. OPI technology can be used to capture, dilute and transfer precisely-controlled low-volume liquid samples at high flow rates to an ionization device of the instrument, such as an electron spray (ESI) ionization source, thus achieving a high-throughput analytical platform with high reproducibility, and wide compound coverage. One advantage of OPI technology is that it allows ejection of a sample from a complex matrix and its direct introduction into the ion source of the mass spectrometer with minimal sample preparation and/or cleanup.

A typical workflow for the use of OPI relies on acoustic ejection of a sample from a homogeneous solution. Such a conventional approach, though successful for a range of assays, can, however, present certain shortcomings. For example, a lower sampling load volume of OPI compared with more traditional ways of introducing a sample into a mass spectrometry system can result in a lower sensitivity. Further, an OPI approach can potentially lead to ionization suppression, especially for high-volume loading of complex matrices.

There have been some efforts in improving acoustic ejection of samples into a mass spectrometer by adding a layer of an immiscible solvent to a sample prior to subjecting the sample to acoustic ejection. Although such an approach has been helpful in improving assay performance, some limitations of such a two-layer approach can include the following: (1) LLE may not be capable of separating species having similar properties; (2) the sensitivity of such an approach can be limited due to the need for a particular volume of the extraction phase.

In another approach, acoustic ejection of magnetic particles can be employed for introducing a sample into a mass spectrometer. In such an approach, magnetic particles can be used for sample clean-up and separating an analyte from isomeric interference. However, the sensitivity of such an approach can also be limited due to relatively small fraction of beads that will be sampled into the mass spectrometer.

Accordingly, there is a need for systems and methods that can enhance the introduction of samples, e.g., via acoustic ejection, into a mass spectrometer.

SUMMARY

In one aspect, a method of extracting a target analyte from a sample for introduction into a mass spectrometer is disclosed, which includes subjecting the sample to a magnetic field gradient so as to cause a magnetic-field induced non-homogenous distribution of the target analyte and one or more interfering components, if any, through the sample. Such non-homogeneous distribution of the target analyte and the interfering component(s) can result in the enhancement of the concentration of the target analyte in a spatial location of the sample. In some such embodiments, the target analyte can be extracted from such a spatial location, e.g., using acoustic ejection or other methods, and the extracted target analyte can be introduced into a downstream mass spectrometer.

In a related aspect, a method of extracting a target analyte from a sample for introduction into a mass spectrometer is disclosed, which includes mixing the sample with a paramagnetic medium to form a mixture, subjecting the mixture to a magnetic field gradient to form a non-homogenous distribution of at least one of the analyte and at least one interfering component of the sample, if any, thereby enhancing a concentration of the target analyte within a spatial location of said mixture, extracting at least a portion of the target analyte from that spatial location, and introducing at least a portion of the extracted target analyte into said mass spectrometer.

In some embodiments, the enhancement of the concentration of the analyte in the spatial location results in enhancing a concentration ratio of that analyte relative to at least one interfering component, if any, in that spatial location.

In some embodiments, the magnetic field gradient is configured so as to cause attraction of the analyte and at least one interfering component in opposite directions such that the analyte or the interfering component would move in a direction of increasing magnetic field and the other would move in a direction of decreasing magnetic field.

In some embodiments in which a sample is mixed with a paramagnetic medium (e.g., a paramagnetic salt), the magnetic field gradient can be configured to cause attraction of two different target analytes having different densities to two different locations within the paramagnetic medium. The attraction of the analyte and the paramagnetic medium toward different spatial locations (e.g., toward two spatial locations at one of which the magnetic field strength is at a maximum and at the other it is a minimum), together with the density of the target analyte can determine a spatial location at which the concentration of the target analyte will be enhanced.

In some embodiments, the sample under study is disposed in a sample holder and the sample holder is maintained in a substantially vertical orientation such that a balance of gravity, buoyancy force and the magnetic field gradient can result in the analyte being stably retained in said spatial location. In some such embodiments, the target analyte has a density greater than that of the paramagnetic medium and a balance of the buoyancy force and gravity, in combination with the magnetic force, pushes the target analyte toward a bottom end of the sample holder.

In some embodiments, at least a portion of the analyte can be extracted from the bottom of the sample holder. A variety of techniques can be employed for such extraction of the analyte from the sample holder. By way of example, in some embodiments, iDOT technology from Dispendix (currently CellInk) can be employed to extract the target analyte from the bottom of the sample holder.

In some embodiments, the combination of the density of the target analyte of interest relative to that of the paramagnetic medium and the magnetic field gradient can result in the movement of the target analyte toward a spatial location at which the target analyte will be concentrated (e.g., at a spatial location at which the target analyte will be levitated when the sample holder is vertical). For example, the balance of the buoyancy force and gravity, in combination with the magnetic force, can push the analyte toward a top end of the sample holder. In such an embodiment, at least a portion of the target analyte can be extracted from the top of the sample holder. By way of example, in some embodiments, acoustic ejection can be utilized for extraction of at least a portion of the target analyte from the top of the sample holder.

In some embodiments, the magnetic field gradient can be generated by at least two magnets positioned relative to the sample holder such that one of the magnets is positioned in vicinity of the top end of the sample holder and the other magnet is positioned in vicinity of the bottom end of the sample holder with the two poles of the magnets substantially facing one another. In some such embodiments, such an arrangement of the two magnets can generate a magnetic field gradient exhibiting a maximum strength in the vicinity of the top and the bottom ends of the sample holder and a minimum strength in the vicinity of the middle portion of the sample holder.

In some embodiments, prior to mixing the sample with the paramagnetic medium, a plurality of diamagnetic particles that are functionalized to capture the target analyte can be introduced into the sample so as to capture at least a portion of the target analyte by the functionalized diamagnetic particles. In some such embodiments, the magnetic field gradient can cause the diamagnetic particles to be attracted toward said spatial location. In some embodiments, the diamagnetic particles can include any of silicon, PMMA, polystyrene, Teflon, silica, etc. By way of example, in some embodiments, the diamagnetic particles can be functionalized with an antibody that exhibits specific binding to a target analyte.

In some embodiments, the paramagnetic medium can include, for example, an aqueous solution of one or more paramagnetic salts. Some examples of such paramagnetic salts include, without limitation, any of $MnCl_2$ and $GdCl_3$.

In some embodiments, the analyte can include a plurality of droplets that are immiscible in the paramagnetic medium.

In some embodiments, the introduction of at least a portion of the extracted analyte into the mass spectrometer can be achieved by directing the extracted analyte to an inlet port of the mass spectrometer. In some embodiments, the inlet port of the mass spectrometer is an open port interface (OPI).

In some embodiments of the above method, the magnetic field gradient can increase the concentration ratio of the analyte relative to the interfering component in one spatial location ("first location") of the sample and increase the concentration ratio of the interfering component relative to the target analyte in another spatial location ("second location") of the sample. In some such embodiments, the interfering component, or at least a portion thereof, can be removed from the second location and discarded prior to extracting the target analyte.

In a related aspect, a method for selective extraction of a plurality of different target analytes from a sample for introduction into a mass spectrometer is disclosed, which comprises mixing the sample with a plurality of different types of diamagnetic particles having different specific densities to form a first mixture, wherein at least a portion of each type of the diamagnetic particles is functionalized so as to capture at least one of the different target analytes, and mixing the mixture of the sample and the diamagnetic particles with a paramagnetic medium to generate a second mixture. A magnetic field gradient is applied to the second mixture so as to localize said different types of diamagnetic particles in different spatial locations of said second mixture, thereby separating the different types of analytes captured by said different types of magnetic particles into different spatial locations, At least a portion of at least one of the different types of diamagnetic particles can be extracted and the extracted portion can be introduced into the mass spectrometer.

In some embodiments, acoustic ejection can be employed to extract at least a portion of at least one of the different types of the diamagnetic particles.

In some embodiments, the second mixture is disposed in a sample holder maintained in a substantially vertical orientation so as to allow a balance of the magnetic field gradient, gravity and buoyancy force to cause separation of the different types of diamagnetic particles in said different spatial locations.

In some embodiments, different types of diamagnetic particles can be employed, where the different types of the diamagnetic particles can be functionalized to capture different types of analytes. By way of example, one type of the diamagnetic particles can include silicon, and another type of the diamagnetic particles can include PMMA (poly methyl methacrylate). By way of example, in some embodiments, a portion of the diamagnetic particles can be functionalized with one antibody and another portion of the diamagnetic particles can be functionalized with another (different) antibody such that one portion of the diamagnetic particles can capture one target analyte and another portion of the diamagnetic particles can capture a different target analyte. Various techniques for immobilizing antibodies or aptamer onto a variety of different surfaces are known. By way of example, such techniques can functionalize the surface with suitable chemical moieties (e.g., COOH, OH, etc.), which can then facilitate the coupling of an agent of interest, e.g., an antibody, onto the surface.

In a related aspect, a method of extracting an analyte from a sample for introduction into a mass spectrometer is disclosed, which comprises introducing a plurality of magnetic particles into the sample such that at least a portion of the magnetic particles can be coupled to the target analyte (e.g., if the analyte is a cell, the magnetic particles can attach to the cell's surface or be internalized into the cell's cytoplasm), so as to magnetize the target analyte. A magnetic field gradient can be applied to the sample so as to enhance a concentration of the analyte in a spatial location within said sample, followed by extracting at least a portion of the target analyte from that spatial location, and introducing at least a portion of the extracted analyte into a mass spectrometer. In some such embodiments, the extraction of at least a portion of the target analyte from said spatial location comprises utilizing acoustic ejection or inkjet sampling.

In some embodiments, the analyte can include one or more cells and the magnetic particles can be attached to the cell's surface or be transferred into the cell's cytoplasm. Some examples of suitable magnetic particles can include, without limitation, paramagnetic particles (formed from, for example, aluminum, oxygen, titanium, and iron oxide) and ferromagnetic particles (formed from, for example, iron, cobalt and nickel).

In a related aspect, a system for introducing an analyte contained in a sample into a mass spectrometer is disclosed, which includes a plurality of diamagnetic particles functionalized to capture the analyte, and a sample holder for receiving a mixture. The mixture can include the sample, the plurality of diamagnetic particles and a paramagnetic medium, where at least a portion of the analyte in the mixture is captured by the functionalized diamagnetic particles. The system can further include a plurality of magnets arranged relative to the sample holder so as to generate a magnetic field gradient within the sample holder so as to enhance concentration of the diamagnetic particles in at least one spatial location of the sample holder. The system can also include a sample extraction device for extracting at least a portion of the diamagnetic particles from said spatial location and directing the extracted portion to the mass spectrometer.

In some embodiments of the above system, the extraction device can include an acoustic ejection device. In some other embodiments, the sample extraction device can employ inkjet sampling for extracting the diamagnetic particles from said spatial location.

In some embodiments of the above system, the mass spectrometer can include an open port interface that is in fluid communication with the sample extraction device for receiving at least a portion of the extracted diamagnetic particles.

In some embodiments of the above system, the mass spectrometer can further include an ion source that is in communication with said open port interface such that the flow of a solvent through said open port interface releases at least a portion of the analyte from the diamagnetic particles and guides the released analyte to said ion source. The ion source can ionize at least a portion of the analyte received from the open port interface.

In some embodiments, the mass spectrometer can further include at least one mass analyzer that is disposed downstream of the ion source to receive the generated ions and provide mass analysis of those ions. A variety of different mass analyzers can be employed in the practice of various aspects of the present teachings. Some examples of such mass analyzers include, for example, multipole (such as quadrupole) and time-of-flight (TOF) mass analyzers. In some embodiments, tandem mass analyzers can be positioned downstream of the ion source to perform $MS^{(n)}$ analysis of the generated ions. By way of example, in some such embodiments, one or more quadrupole mass analyzers can be utilized to select parent ions having a desired mass-to-charge ratio, and the selected parent ions can be fragmented in a downstream collision cell and the resultant ion fragments can be analyzed by another quadrupole mass analyzer.

In a related aspect, a method of extracting a target analyte from a sample for introduction into a mass spectrometer is disclosed, which includes subjecting the sample to a magnetic field gradient so as to cause a magnetic-field induced non-homogeneous distribution of the target analyte and one or more interfering components, if any, through the sample so as to enhance concentration of the target analyte in a spatial location of the sample, and extracting at least a portion of the target analyte from said spatial location. The extracted portion of the target analyte can be introduced into an Open Port Interface (OPI) of a mass spectrometer.

Further understanding of various aspects of the present teachings can be obtained by reference to the following detailed description in conjunction with the associated drawings, which are described briefly below.

DETAILED DESCRIPTION

In some aspects, the present disclosure is generally related to methods and systems for concentrating one or more target analytes contained in a sample in one or more spatial locations of the sample, and optionally extracting the one or more target analytes from those spatial locations for introduction into a downstream mass spectrometer.

Figure 1:
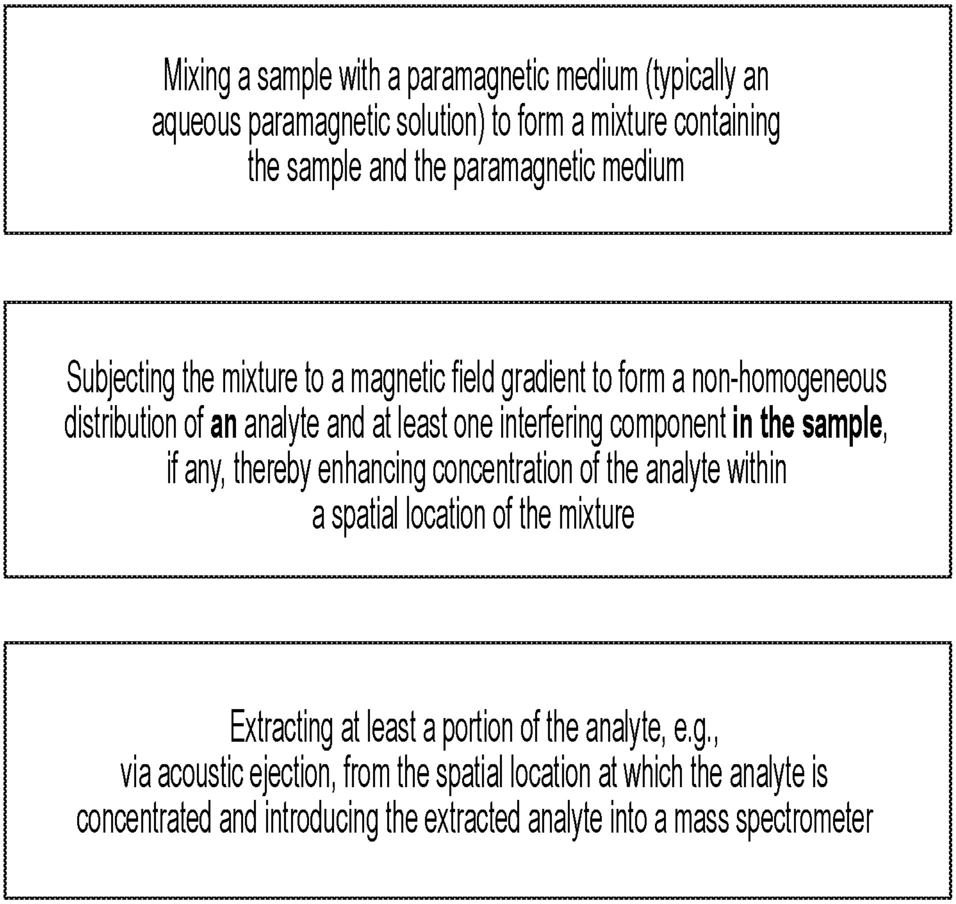
FIG. 1 is a flow chart depicting various steps in a method according to an embodiment for extracting a target analyte from a sample, FIG. 2 schematically depicts separation of a plurality of diamagnetic particles functionalized with one or more analytes according to an embodiment of the present teachings, FIG. 3 schematically depicts a system according to an embodiment of the present teachings for concentration a target analyte at a spatial location within a sample holder, FIG. 4A schematically depicts separating two types of diamagnetic beads in accordance with the present teachings, where the magnetic beads exhibit different densities and are functionalized to capture different analytes, FIG. 4B schematically depicts separating a target analyte in a sample from an interfering component and removing the interfering component prior to extracting the target analyte.

With reference to the flow chart of FIG. 1, in one embodiment of a method according to the present teachings for extracting a target analyte from a sample for introduction into a mass spectrometer, the sample is mixed with a paramagnetic medium (typically an aqueous paramagnetic solution) to form a mixture containing the sample and the paramagnetic medium (step 1). The mixture can be subjected to a magnetic field gradient to form a non-homogeneous distribution of the analyte and at least one interfering component (such as an isomeric interfering component), if any, thereby enhancing the concentration of the analyte within a spatial location of the mixture (step 2). At least a portion of the analyte can be extracted from that spatial location and at least a portion of the extracted analyte can be introduced into the mass spectrometer (step 3). By way of example, in some embodiments, at least a portion of the extracted analyte can be introduced into an open port interface of the mass spectrometer.

As discussed above, in some embodiments, the magnetic field gradient, in combination with the buoyancy force and gravity, can cause an enhancement of a concentration ratio of the analyte relative to at least one interfering component in a spatial location of the mixture.

The magnetic field gradient can have a variety of different profiles. In general, the magnetic field gradient is configured such that the combination of the magnetic field gradient, the buoyancy and gravitational force, can attract one component of the mixture (e.g., the target analyte or the paramagnetic medium) toward a highest field strength and attract the other component toward a lowest field strength associated with the magnetic field gradient so as to enhance concentration of the analyte in the spatial location.

Figure 2:
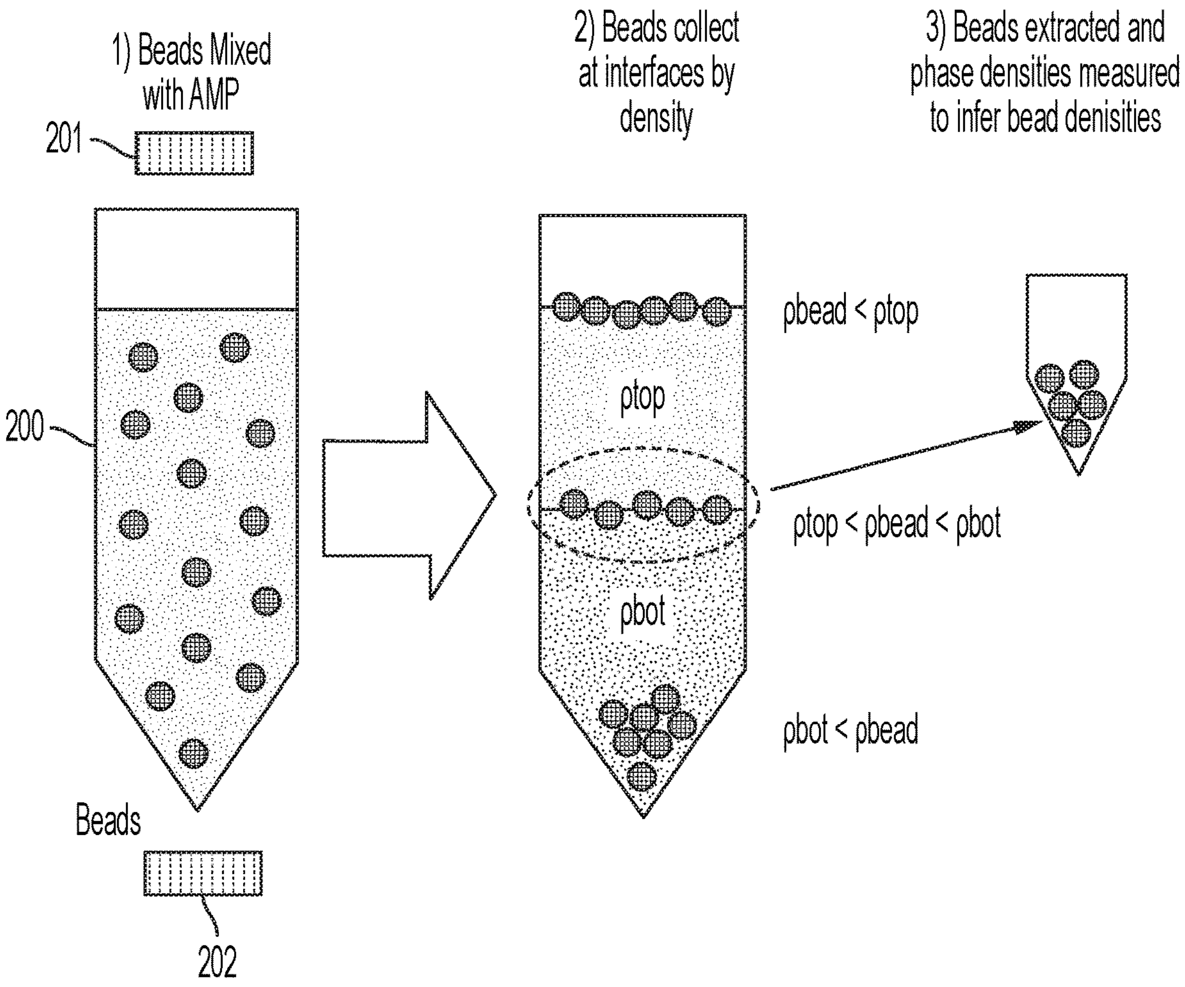

By way of example, as shown schematically in FIG. 2, a plurality of diamagnetic particles (e.g., beads) that are surface-functionalized so as to capture one or more target analytes can be mixed with a paramagnetic medium (e.g., an aqueous solution of one or more paramagnetic salts), and the mixture can be stored in a sample holder 200. The application of a magnetic field gradient to the mixture (e.g., via a pair of magnets 201/202 positioned in proximity of the top and the bottom ends of a sample holder 200) can result in generation of a magnetic field gradient within the sample holder, which can in turn cause migration of the surface-functionalized diamagnetic particles to certain spatial location(s) of the sample. More specifically, the balance of the magnetic, gravitational, and buoyancy forces can result in a stable levitation height for the surface-functionalized diamagnetic particles within the paramagnetic medium. For example, the balance of these forces can cause the surface-functionalized diamagnetic particles to collect at the top, the middle, or the bottom of the sample holder based on the density of the diamagnetic particles relative to that of the paramagnetic medium and the profile of the magnetic field gradient.

In some embodiments, a plurality of diamagnetic particles (e.g., diamagnetic beads) having different densities and surface-functionalized to capture different target analytes of interest can be employed. When mixed with a paramagnetic medium, under the influence of the magnetic field gradient, the diamagnetic particles of different densities collect at different spatial locations of the sample, thereby leading to the isolation of each captured target analyte at a different spatial location of the sample. In this manner, different target analytes can be separated from one another. In some embodiments, the target analyte of interest can be extracted from a spatial location at which that target analyte has been collected.

A variety of techniques can be employed to extract a target analyte that has been concentrated in a spatial location of the sample in accordance with the present teachings. Some examples of such extraction techniques include, without limitation, acoustic ejection and ink jet sampling.

Figure 3:
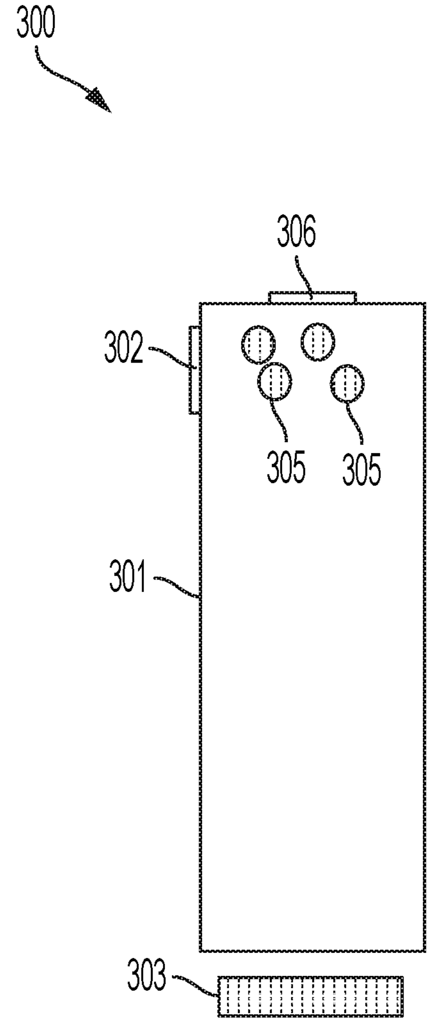

By way of illustration, FIG. 3 schematically depicts a system 300 according to an embodiment of the present teachings, which includes a sample holder 301 for receiving a mixture, e.g., a mixture comprising a sample suspected of containing one or more target analytes of interest and one or more diamagnetic beads that are surface functionalized to capture the target analytes when present in the sample.

By way of example, the sample holder can include an inlet port 302 that is located in proximity of a top end thereof through which the mixture can be introduced into the sample holder. In this embodiment, a pair of magnets (not shown), e.g., a pair of permanent magnets or electromagnets, are positioned, respectively, in proximity of the top and the bottom end of the sample holder so as to generate a magnetic field gradient within the sample holder to which the mixture will be subjected. For example, the two magnets can be positioned relative to one another such that the same magnetic poles of the two magnets (e.g., S or N poles) are facing one another so as to generate a magnetic field gradient that is at a maximum in proximity of the top and bottom ends of the sample holder and at a minimum at or in proximity of the middle of the sample holder.

As noted above, the mixture can contain a paramagnetic medium within which the functionalized diamagnetic beads 305 are distributed. The magnetic field gradient, together with the gravitational and buoyancy force, can cause one of the paramagnetic medium and diamagnetic beads to move toward a location corresponding to a maximum value of the magnetic field and the other to move toward a location corresponding to a minimum value of the magnetic field, thereby concentrating the surface-functionalized beads in a spatial location of the sample.

Without any loss of generality, it is assumed that in this embodiment, the surface-functionalized diamagnetic beads 305 are concentrated in proximity of the top end of the sample holder. With continued reference to FIG. 3, in this embodiment, an acoustic ejection device (e.g., an acoustic transducer) 303 is coupled to the sample holder to cause the ejection of a plurality of diamagnetic beads 305 that are concentrated in proximity of the top end of the sample holder, via application of ultrasound waves, through an output port 306 of the sample holder into an Open Port Interface (OPI) of a mass spectrometer (See, e.g., FIG. 6).

In this embodiment, a continuous flow of a solvent through the OPI can cause detachment of at least some of the one or more target analytes, which were attached to the diamagnetic beads, from those beads and transfer those analyte(s) into an ion source of the mass spectrometer.

The functionalization of the diamagnetic beads for capturing a target analyte of interest can be achieved in a variety of different ways known in the art. For example, in some embodiments, the diamagnetic beads can be surface-functionalized with an antibody that exhibits specific binding to an analyte of interest. In such embodiments, mixing a sample suspected of containing the analyte of interest with the surface-functionalized beads can result in the coupling of at least a portion of the analyte of interest, when present in the sample, to the beads As noted above, in some embodiments, a plurality of different types of diamagnetic beads having different densities can be employed, where each type of the diamagnetic beads is surface-functionalized to capture a different analyte. By way of example, FIG. 4 schematically depicts separating two types of diamagnetic beads 400 and 401 exhibiting different densities, where each type is functionalized to capture a different analyte, into two different spatial locations within a sample holder 402. By way of example, one type of the diamagnetic beads 400 can be surface functionalized with one type of antibody and the other type of the diamagnetic bead 401 can be surface functionalized with another type of antibody.

More specifically, similar to the previous embodiment, in this embodiment, surface-functionalized diamagnetic beads 400 and 401 are mixed in a paramagnetic medium (e.g., an aqueous solution of one or more paramagnetic salts). Without any loss of generality, in this embodiment, the collective effect of the magnetic field gradient, gravity, and the buoyancy force causes the diamagnetic beads 400 to accumulate in proximity of the top end of the sample holder and the diamagnetic beads 401 to accumulate in proximity of the bottom end of the sample holder. In this manner, the beads carrying different types of analytes can be spatially separated such that each analyte can be selectively removed from the sample holder and introduced into a mass spectrometer.

Figure 4A:
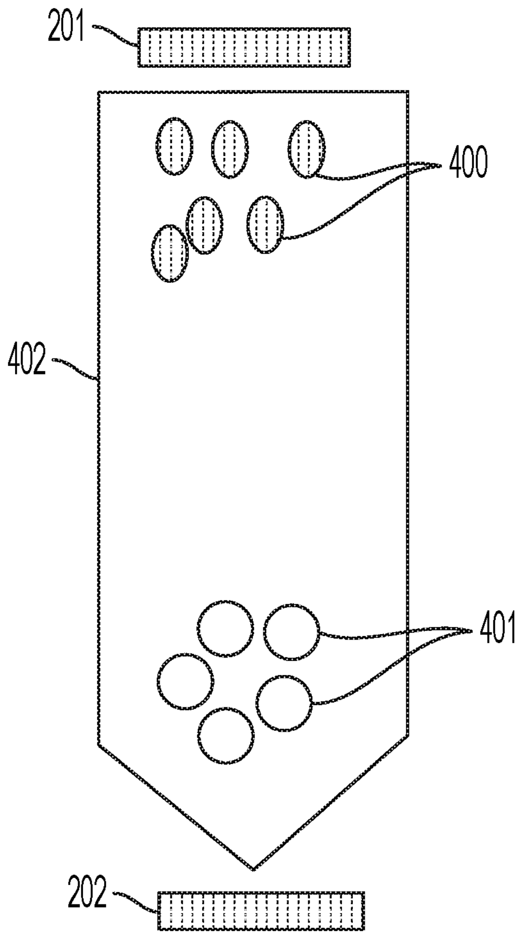

With continued reference to FIG. 4A, in this embodiment, the diamagnetic beads 400 can be removed from the top end of the sample holder and introduced into the mass spectrometer via acoustic ejection. Further, the diamagnetic beads 401 can be removed from the bottom of the sample holder, e.g., via inkjet sampling. As noted above, the extracted diamagnetic beads can be introduced into the OPI of a mass spectrometer to be diluted and transferred to a downstream ion source. In some embodiments, immiscible droplets (e.g., oil droplets) can be concentrated in different portions of a paramagnetic medium using the present teachings, e.g., based on the density of the droplets. In other words, the present teachings are not limited to separating only solid particles, but can also be applied to liquid droplets, e.g., olive oil, etc.

Figure 4B:
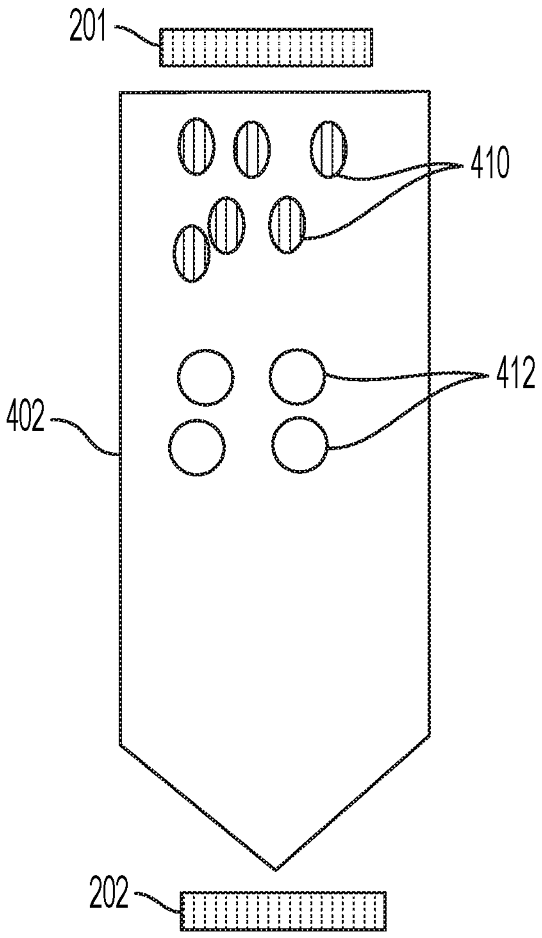

With reference to FIG. 4B, in some embodiments, the magnetic field gradient (together with gravity and the buoyancy force) can cause an interfering component (e.g., an isomeric interfering component) 410 to collect at the top of the sample holder and a target analyte of interest 412 to collect below the interfering component. In such an embodiment, the interfering component can be removed from the top end of the sample holder (e.g., via acoustic ejection) and subsequently, the target analyte (e.g., a plurality of diamagnetic beads functionalized with a target analyte) can be extracted from the top end of the sample holder (e.g., via acoustic ejection) and be introduced into a downstream mass spectrometer.

In yet other embodiments, the present teachings can be employed to separate target analytes having unique densities, such as cells, small solid particles (e.g., with a size in a range of about 10 nm to about 100 nm without using surface-functionalized diamagnetic beads and/or liquid droplets.

Figure 5:
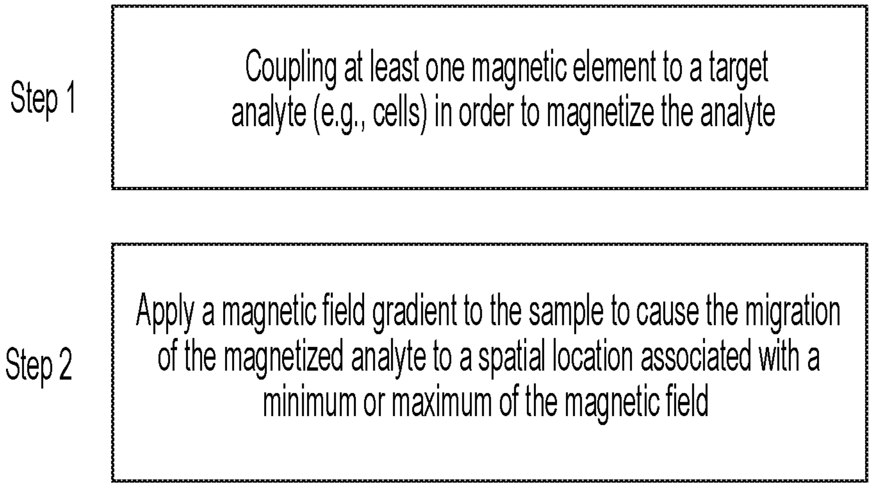
FIG. 5 is a flow chart depicting various steps for concentrating a magnetized component of a sample from at least one other constituent of the sample.

By way of example, FIG. 5 presents a flow chart indicating various steps in separating target analytes in which a magnetic element (such as magnetic particles discussed herein) is introduced onto or into a target analyte (e.g., a cell) in order to magnetize the analyte (step 1). By way of example, in some embodiments, the magnetic particles can attach to a cell's membrane. In addition, or alternatively, in some embodiments, the magnetic particles can be transferred within the cell.

The application of a magnetic field gradient to the sample disposed within the sample holder can cause the migration of the magnetized analyte toward a spatial location associated with the minimum (maximum) of the magnetic field (step 2). In this manner, the analyte can be accumulated at that spatial location and can be removed from that location using various mechanisms disclosed herein, such as acoustic ejection.

Figure 6:
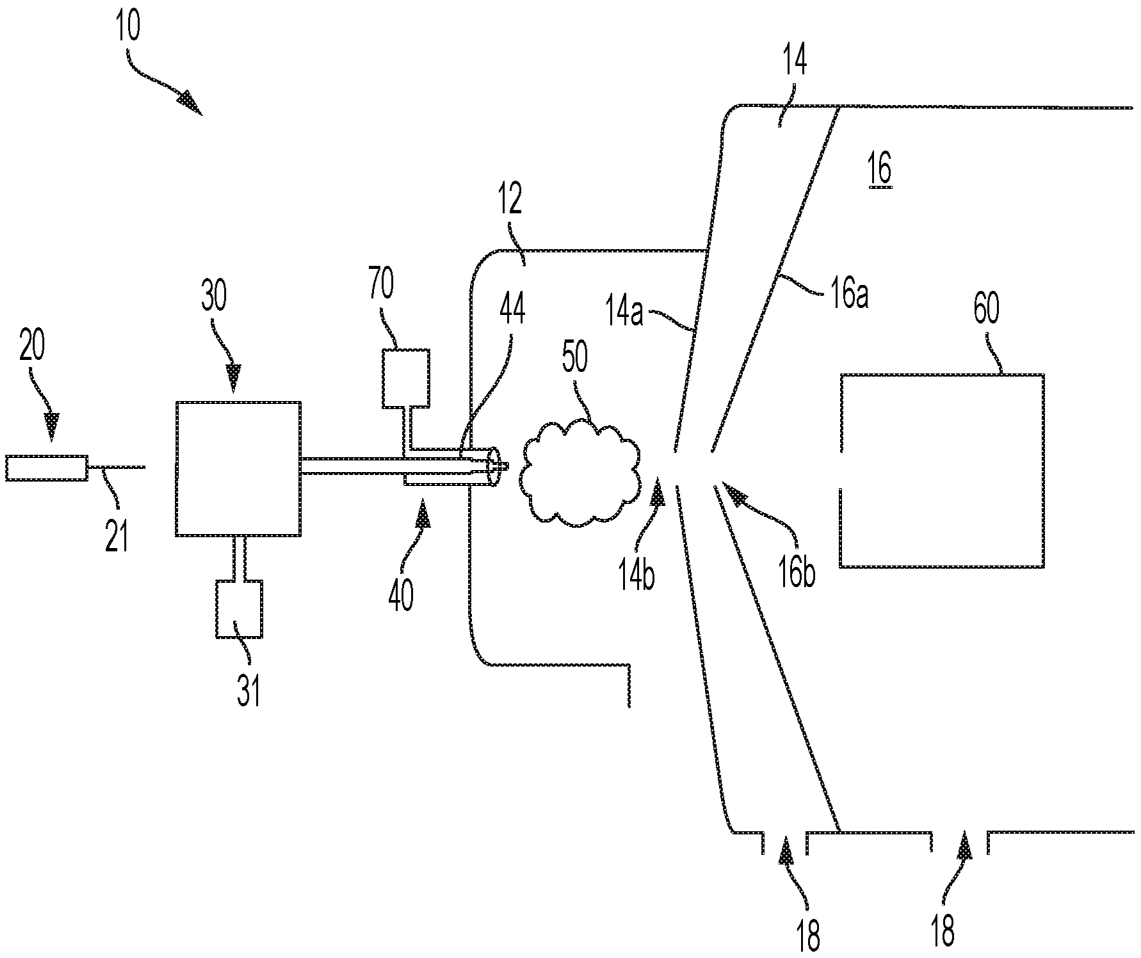
FIG. 6 is a schematic view of a mass spectrometer in which a system according to the present teachings can be incorporated.

A system according to the present teachings for introducing an analyte into a mass spectrometer can be employed in a variety of mass spectrometers. By way of example, FIG. 6 schematically depicts a mass spectrometer 10 according to an embodiment, which includes a device 20 according to the present teachings for concentrating an analyte in a spatial location of a sample holder, e.g., in the vicinity of the top end of the sample holder. An acoustic ejection device 21 is employed to eject at least a portion of the analyte of interest, which is concentrated in the vicinity of the top end of the sample holder in this embodiment, into an OPI 30 of the mass spectrometer 10, wherein the OPI 30 is in fluid communication with an ion source 40 for discharging a liquid containing the target analyte into an ionization chamber 12 of the ion source 40.

A mass analyzer 60 is disposed downstream of the ionization chamber 12 and is in fluid communication with the ionization chamber 12 for downstream processing and/or detection of ions generated by the ion source. The ionization chamber 12 can be maintained at an atmospheric pressure, though in some embodiments, the ionization chamber 12 can be evacuated to a pressure lower than atmospheric pressure.

In this embodiment, the ionization chamber 12 is separated from a gas curtain chamber 14 by a plate 14*a* having a curtain plate aperture 14*b*. As shown, a vacuum chamber 16, which houses the mass analyzer 60, is separated from the curtain chamber 14 by a plate 16*a* having a vacuum chamber sampling orifice 16*b*. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

As discussed in more detail below, the flow of a solvent (e.g., methanol) through the OPI 30 can transfer the target analyte to the downstream ionization chamber 12. For example, in embodiments in which the target analyte is anchored onto the surface of a plurality of diamagnetic particles, the diamagnetic particles can be placed in a fluid pathway in the OPI 30 extending between a desorption solvent source 31 and the ion source probe (e.g., electrospray electrode 44). The analytes are desorbed from the surface of the diamagnetic particles by the desorption solvent and are introduced into an ion source probe (e.g., electrospray electrode 44). In this manner, analytes desorbed from the coated surface of the diamagnetic particles by the desorption solvent flow directly to the ion source 40.

The ion source 40 can have a variety of configurations but is generally configured to ionize an analyte contained within a liquid (e.g., the desorption solvent) that is received from the OPI 30. In the exemplary embodiment depicted in FIG. 6, an electrospray electrode 42, which can comprise a capillary fluidly coupled to the substrate sampling probe 20, terminates in an outlet end that at least partially extends into the ionization chamber 12 and discharges the desorption solvent therein.

As will be appreciated by a person skilled in the art in light of the present teachings, the outlet end of the electrospray electrode 44 can atomize, aerosolize, nebulize, or otherwise discharge (e.g., spray with a nozzle) the desorption solvent into the ionization chamber 12 to form a sample plume 50 comprising a plurality of micro-droplets generally directed toward (e.g., in the vicinity of) the curtain plate aperture 14*b* and vacuum chamber sampling orifice 16*b*. As is known in the art, analytes contained within the micro-droplets can be ionized (i.e., charged) by the ion source 40, for example, as the sample plume 50 is generated.

By way of non-limiting example, the outlet end of the electrospray electrode 44 can be made of a conductive material and electrically coupled to a pole of a voltage source (not shown), while the other pole of the voltage source can be grounded. Micro-droplets contained within the sample plume 50 can thus be charged by the voltage applied to the outlet end such that as the desorption solvent within the droplets evaporates during desolvation in the ionization chamber 12, bare charged analyte ions are released and drawn toward and through the apertures 14*b*, 16*b* and focused (e.g., via one or more ion lens) into the mass analyzer 60.

Though the ion source probe is generally described herein as an electrospray electrode 44, it should be appreciated that any number of different ionization techniques known in the art for ionizing liquid samples and modified in accordance with the present teachings can be utilized as the ion source 40. By way of non-limiting example, the ion source 40 can be an electrospray ionization device, a nebulizer assisted electrospray device, a chemical ionization device, a nebulizer assisted atomization device, a photoionization device, a laser ionization device, a thermospray ionization device, or a sonic spray ionization device.

With continued reference to FIG. 6, the mass spectrometer system 10 can optionally include a source of pressurized gas (e.g., nitrogen, air, or noble gas) (not shown) that supplies a high velocity nebulizing gas flow which surrounds the outlet end of the electrospray electrode 44 and interacts with the fluid discharged therefrom to enhance the formation of the sample plume 50 and the ion release within the plume for sampling by 14*b* and 16*b*, e.g., via the interaction of the high speed nebulizing flow and jet of liquid sample. The nebulizer gas can be supplied at a variety of flow rates, for example, in a range from about 0.1 L/min to about 30 L/min.

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 20. By way of non-limiting example, the mass analyzer 60 can be a triple quadrupole mass spectrometer, or any other mass analyzer known in the art and modified in accordance with the teachings herein. It will further be appreciated that any number of additional elements can be included in the mass spectrometer system including, for example, an ion mobility spectrometer (e.g., a differential mobility spectrometer) that is configured to separate ions based on their mobility through a drift gas rather than their mass-to-charge ratio. Additionally, it will be appreciated that the mass analyzer 60 can comprise a detector that can detect the ions which pass through the analyzer 60 and can, for example, supply a signal indicative of the number of ions per second that are detected.

Figure 7:
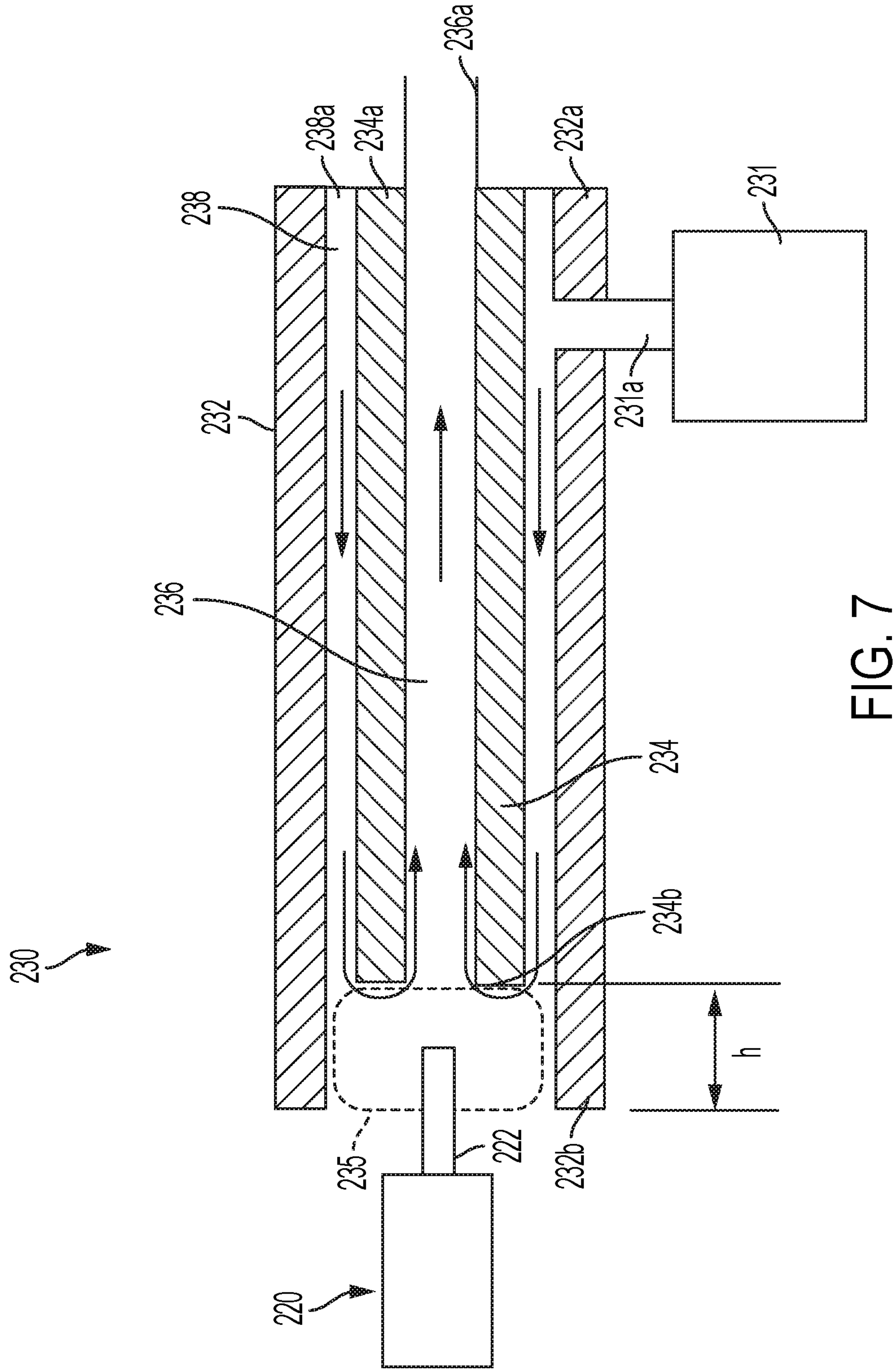
FIG. 7 is a schematic view of an Open Port Interface (OPI) that can receive a sample in accordance with various embodiments of the present teachings and guide the received sample to an ion source of a downstream mass spectrometer.

By way of illustration, FIG. 7 schematically depicts an exemplary OPI 230 for receiving a target analyte from a sampling device according to the present teachings. In this embodiment, the OPI 230 includes an outer tube (e.g., outer capillary tube 232) extending from a proximal end 232*a* to a distal end 232*b* and an inner tube (e.g., inner capillary tube 234) disposed co-axially within the outer capillary tube 232. As shown, the inner capillary tube 234 also extends from a proximal end 234*a* to a distal end 234*b*.

The inner capillary tube 234 comprises an axial bore providing a fluid channel therethrough, which as shown in the exemplary embodiment of FIG. 7 defines a sampling conduit 236 through which liquid can be transmitted from the OPI 230 to the ion source 40 of FIG. 6 (i.e., the sampling conduit 236 is fluidly coupled to an inner bore of the electrospray electrode 44). On the other hand, the annular space between the inner surface of the outer capillary tube 232 and the outer surface of the inner capillary tube 234 can define a desorption solvent conduit 238 extending from an inlet end coupled to the desorption solvent source 231 (e.g., via conduit 231*a*) to an outlet end adjacent the distal end 234*b* of the inner capillary tube 234).

In some exemplary aspects of the present teachings, the distal end 234*b* of the inner capillary tube 234 can be recessed relative to the distal end 232*b* of the outer capillary tube 232 (e.g., by a distance h as shown in FIG. 7) so as to define a distal fluid chamber 235 of the OPI 230, which extends between and is defined by the distal end 234*b* of the inner capillary tube 234 and the distal end 232*b* of the outer capillary tube 232. Thus, the distal fluid chamber 235 represents the space adapted to contain fluid between the open distal end of the OPI 230 and the distal end 234*b* of the inner capillary tube 234.

Further, as indicated by the curved arrows of FIG. 7, the desorption solvent conduit 238 is in fluid communication with the sampling capillary 236 via this distal fluid chamber 235. In this manner and depending on the fluid flow rates of the respective channels, fluid that is delivered to the distal fluid chamber 235 through the desorption solvent conduit 238 can enter the inlet end of the sampling conduit 236 for transmission to its outlet end and subsequently to the ion source. It should be appreciated that though the inner capillary tube 234 is described above and shown in FIG. 7 as defining the sampling conduit 236 and the annular space between the inner capillary tube 234 and the outer capillary tube 232 defines the desorption solvent conduit 238, the conduit defined by the inner capillary tube 234 can instead be coupled to the desorption solvent source 231 (so as to define the desorption solvent conduit) and the annular space defined between the inner and outer capillaries 234, 232 can be coupled to the ion source so as to define the sampling conduit.

As shown in FIG. 7, the desorption solvent source 231 can be fluidly coupled to the desorption solvent conduit 238 via a supply conduit 231*a* through which desorption solvent can be delivered from a reservoir of desorption solvent at a selected volumetric rate, e.g., via one or more pumping mechanisms including reciprocating pumps, positive displacement pumps such as rotary, gear, plunger, piston, peristaltic, diaphragm pump, and other pumps such as gravity, impulse and centrifugal pumps can be used to pump liquid sample), all by way of non-limiting example.

Any desorption solvent effective for transferring the analyte to the ion source and amenable to the ionization process are suitable for use in the present teachings. Similarly, it will be appreciated that one or more pumping mechanisms can be provided for controlling the volumetric flow rate through the sampling conduit 236 and/or the electrospray electrode (not shown), these volumetric flow rates selected to be the same or different from one another and the volumetric flow rate of the desorption solvent through the desorption solvent conduit 238. In some aspects, these different volumetric flow rates through the various channels of the substrate sampling probe 230 and/or the electrospray electrode 244 can be independently adjusted (e.g., by adjusting the flow rate of the nebulizer gas) so as to control the movement of fluid throughout the system.

By way of non-limiting example, the volumetric flow rate through the desorption solvent conduit 238 can be temporarily increased relative to the volumetric flow rate through the sampling conduit 236 such that the fluid in the distal fluid chamber 235 overflows from the open end of the OPI 230 to clean any deposited residual sample and/or any airborne material from being transmitted into the sampling conduit 236. In other aspects, the volumetric flow rates can be adjusted such that the fluid flow is decreased upon introduction of the ejected analyte to concentrate the received analyte in a smaller volume of the desorption solvent.

It will be appreciated that sampling probes in accordance with the present teachings can also have a variety of configuration and sizes, with the OPP depicted in FIG. 7 representing an exemplary depiction. By way of non-limiting example, the dimensions of an inner diameter of the inner capillary tube can be in a range from about 1 micron to about 1 mm (e.g., 200 microns), with exemplary dimensions of the outer diameter of the inner capillary tube being in a range from about 100 microns to about 3 or 4 millimeters (e.g., 360 microns). Also by way of example, the dimensions of the inner diameter of the outer capillary tube can be in a range from about 100 microns to about 3 or 4 millimeters (e.g., 450 microns), with the typical dimensions of the outer diameter of the outer capillary tube being in a range from about 150 microns to about 3 or 4 millimeters (e.g., 950 microns). The cross-sectional shapes of the inner capillary tube and/or the outer capillary tube can be circular, elliptical, super-elliptical (i.e., shaped like a super-ellipse), or even polygonal (e.g., square).

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 40.

By way of non-limiting example, the mass analyzer 60 can be a triple quadrupole mass spectrometer, or any other mass analyzer known in the art and modified in accordance with the teachings herein. It will further be appreciated that any number of additional elements can be included in the mass spectrometer system including, for example, an ion mobility spectrometer (e.g., a differential mobility spectrometer) that is configured to separate ions based on their mobility through a drift gas rather than their mass-to-charge ratio. Additionally, it will be appreciated that the mass analyzer 60 can comprise a detector that can detect the ions which pass through the analyzer 60 and can, for example, supply a signal indicative of the number of ions per second that are detected.

Those having ordinary skill in the art will appreciate that various changes can be made to the above embodiments without departing from the scope of the invention.

What is claimed is:

1. A method of extracting a target analyte from a sample for introduction into a mass spectrometer, comprising:

mixing the sample, which includes the target analyte and at least one interfering component, with a paramagnetic medium to form a mixture of the sample and the paramagnetic medium, subjecting the mixture to a magnetic field gradient to form a non-homogenous distribution of at least one of said target analyte and the at least one interfering component thereby enhancing a concentration of said target analyte within a spatial location of said mixture, extracting at least a portion of said target analyte from said spatial location, and introducing at least a portion of said extracted target analyte into said mass spectrometer.

2. The method of claim 1, wherein the enhancing the concentration of said analyte within said spatial location results in enhancing a concentration ratio of said analyte relative to the at least one interfering component in said spatial location.

3. The method of claim 2, wherein said magnetic field gradient causes an increase in concentration ratio of said interfering component and said analyte in another spatial location of said mixture.

4. The method of claim 3, further comprising discarding at least a portion of said interfering component from said another spatial location prior to the step of extracting said target analyte.

5. The method of claim 1, wherein said magnetic field gradient is configured to cause attraction of the target analyte and the interfering component having a different density than the target analyte to different locations within said paramagnetic medium.

6. The method of claim 1, wherein said sample is disposed in a sample holder and the sample holder is maintained in a substantially vertical orientation such that a balance of gravity, buoyancy force and said magnetic field gradient results in said analyte being stably maintained within said spatial location.

7. The method of claim 6, wherein said analyte has a density greater than that of the paramagnetic medium and a balance of the buoyancy force and gravity pushes the analyte toward a bottom end of said sample holder.

8. The method of claim 7, further comprising extracting at least a portion of said analyte from the bottom end of the sample holder.

9. The method of claim 8, wherein the step of extracting at least a portion of said analyte from the bottom end of the sample holder comprises utilizing iDOT technology or utilizing inkjet sampling.

10. The method of claim 6, wherein said analyte has a density less than that of the paramagnetic medium such that a balance of the buoyancy force and gravity pushes the analyte toward a top end of said sample holder.

11. The method of claim 10, further comprising extracting at least a portion of the analyte from the top of the sample holder.

12. The method of claim 11, wherein the step of extracting at least a portion of the analyte from the top of the sample holder comprises utilizing acoustic ejection.

13. The method of claim 1, wherein said magnetic field gradient is generated by at least two magnets one of which is positioned in vicinity of a top end of said sample holder and the other is positioned in vicinity of a bottom end thereof such that same poles of the two magnets substantially face one another.

14. The method of claim 1, further comprising, prior to mixing the sample with the paramagnetic medium, introducing a plurality of diamagnetic particles functionalized to capture said target analyte into said sample so as to capture at least a portion of said target analyte by said functionalized diamagnetic particles.

15. The method of claim 14, wherein said magnetic field gradient causes said diamagnetic particles to be attracted toward said spatial location.

16. The method of claim 14, wherein said diamagnetic particles comprise any of silicon, PMMA, polystyrene, Teflon or silica.

17. The method of claim 1, wherein said paramagnetic medium comprises an aqueous solution of one or paramagnetic salts, or wherein said analyte comprises a plurality of droplets that are immiscible in said paramagnetic medium.

18. The method of claim 15, wherein said paramagnetic salts comprise any of MnCb and GdCb.

19. The method of claim 1, wherein the step of introducing at least a portion of said extracted target analyte to said mass spectrometer comprises directing said extracted analyte to an inlet port of the mass spectrometer.

20. The method of claim 18, wherein said inlet port of the mass spectrometer is an open port interface (OPI).

* * * * *